UNITED STATES PATENT OFFICE.

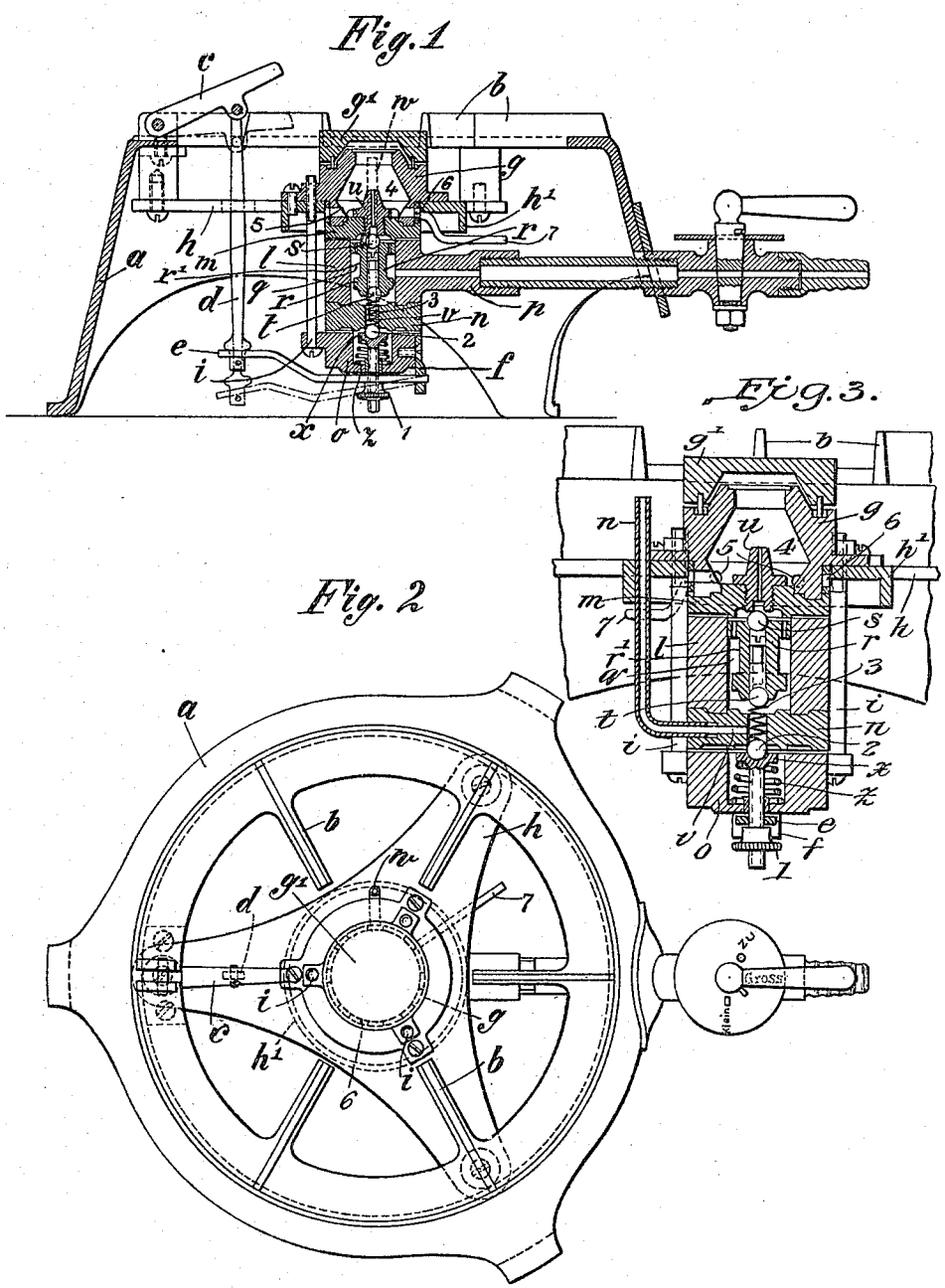

JOHANN FRITSCHI, OF OFTRINGEN, SWITZERLAND, ASSIGNOR TO IDA KAPPELER, OF ZOFINGEN, SWITZERLAND.

GAS COOKING-STOVE.

1,165,587.  Specification of Letters Patent.  Patented Dec. 28, 1915.

Application filed March 4, 1915. Serial No. 11,987.

*To all whom it may concern:*

Be it known that I, JOHANN FRITSCHI, a citizen of the Republic of Switzerland, residing at Oftringen, in the Canton of Aargau, Republic of Switzerland, have invented certain new and useful Improvements in Gas Cooking-Stoves; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Gas cooking stoves, in which a pilot flame is used and the supply of gas to the burner is interrupted automatically when a cooking utensil is removed and is resumed automatically when the same is replaced, are already known.

The invention relates to stoves of this nature and in the gas apparatus forming the object of the present invention, a mixing chamber is arranged in the head of the burner and a chamber of distribution is provided into which the gas supply discharges, the said chamber of distribution communicating with the mixing chamber and with the pipe of the pilot flame, whereby the bore leading to the pilot flame is closed when the bore leading to the mixing chamber is open and vice-versa.

According to another part of the invention, the movement of the lever pressed down by a cooking utensil and lifted by a spring is controlled by two balls connected by a spring, one of these balls closing the outer opening of a bore of the valve casing and the other ball the inner opening of the said bore. By this arrangement the employment of a stuffing box and the disadvantages resulting therefrom are avoided.

The accompanying drawing illustrates one embodiment of the subject of the invention, Figure 1 representing a vertical section, Fig. 2 a plan, and Fig. 3 an enlarged sectional view taken vertically and centrally through the burner mechanism at right angles to Fig. 1.

$a$ indicates the body or support of the gas-cooking stove having the supporting ribs $b$ for a cooking utensil. A lever $c$ capable of being pressed down by a cooking utensil is articulated to the body $a$ and connected to a lever $e$ by means of a rod $d$. The lever $e$ is movably arranged in a carrier $f$, as specified hereinafter. The burner $g$ is secured to a plate $h$ carried by an inwardly turned flange of the body $a$. A downwardly turned flange $h^1$ of the plate $h$ protects the underlying parts from being clogged by overseething fluids. A distributing case consisting of a centrally and transversely bored center piece $l$, an upper and a lower collar $m$ and $n$ and a lower cap $o$ is secured to the lower side of the burner $g$ by means of bolts $i$. The central bore of the lateral extension $p$ of the center piece $l$ discharges to the distribution chamber $q$ inclosing the piston like hollow admission valve $r$ having an annular groove $r^1$ on the periphery. The upper and the lower faces of the admission valve $r$ are fitted to receive a ball $s$ and $t$ respectively the former $s$, serving to close the nozzle $u$ screwed into the collar $m$, while the ball $t$ serves to close the center bore $v$ in the ring $n$. From the bore $v$ branches the by-pass $w$ (Fig. 2) supplying gas to the temporarily burning pilot-flame. The stem of a cup $x$ passes the bottom of the cover $o$ which supports the carrier $f$ above cited. A spring $z$ rests upon the bottom of the cover $o$ and presses upwardly the cup until the nut 1 screwed upon the said stem abuts against the lever $e$. The cup $x$ carries a ball 2 adapted to close the lower opening of the bore $v$ of the collar $n$. A spring 3 placed between the two balls $t$ and 2 tends to press upwardly the ball $t$ and also the valve $r$ and compensates furthermore small differences in the distance between the balls $t$ and 2.

The burner has a wide mixing chamber 4, into which the nozzle $u$ enters.

5 indicates openings provided in the wall of the mixing chamber 4 and allowing the admission of air into the said chamber. The openings 5 may be fully or partially covered by a movable collar 6 having corresponding passages and a handle 7 to facilitate the control of the collar 6.

In the position shown in Fig. 1, the spring $z$ lifts the lever $e$, the rod $d$ and the lever $c$ and the ball $s$ of the admission valve $r$ closes the lower end of the nozzle $u$, so that no gas is admitted to the burner. However a small annular gap left between the valve $r$ and the inner wall of the distributing chamber $q$ allows the gas to flow to the by-pass $w$ leading to the pilot flame which thus burns when the apparatus is not being used. The ball 2 closes the lower orifice of the bore *v* and prevents escaping of gas into the atmosphere.

When a cooking utensil is placed on the apparatus, the lever *c* is pressed down by the former and thereby the cup *x* lowered by means of the rod *d* and lever *e*. The admission valve *r* drops by gravity in the distributing chamber *q* and gas is admitted to the mixing chamber 4 through openings 4' in the upper flange of the valve *r*, the issuing gas lighting at the pilot flame. At the end of the falling movement of the admission valve *r*, the ball *t* closes the bore *v* and the supply of gas to the by-pass is cut off; so that the pilot flame goes out and there is not wasteful consumption of gas by the pilot flame while the cooking utensil rests upon the apparatus.

When the cooking utensil is taken off the stove, the admission valve returns to its closing position under the influence of the spring *z*, ball 2 and spring 3, thus checking the further supply of gas to the burner and causing the heating flame to go out. At the same time the lever *e*, the rod *d* and the arm *c* are lifted to their initial positions. As soon as the ball *t* begins its upward movement, the bore *v* is uncovered and gas is admitted to the by-pass and the pilot tube.

As shown in the drawing, the capacity of the mixing chamber 4, compared with the width of the gap between the casing of the burner *g* and the cover $g^1$ of the same is large, so that after closing the supply to the said chamber, the main flame may still burn a few seconds within which time gas may escape from the by-pass and ignite at the main flame.

As mentioned above, the pilot flame is extinguished during the burning of the main flame whereby a considerable economy of gas is annually obtained. It is a known fact, that the pressure of gas in a large distributing net, tubes, or other devices by which the gas is led to the cooking apparatus differs at the different discharging places, by means of the sliding collar 6 the ratio of mixing gas and air may be accommodated once for all to the local degree of the gas pressure. It is well understood that the pressure of the gas is not the same on all places of a plant of this type, but with the ring 6 it is possible to turn on a great or a little quantity of air to the gas and to the burner as is desired, thereby rendering the same controlable to a nicety.

The arrangement of the two balls *t* and 2 and the intermediate spring 3 secures the advantage that a stuffing box for guiding and tightening the stem of the cup *x* may be omitted and that the sliding resistance of the cup *x* will not be altered by changes of the temperature of the valve casing.

What I claim is:

1. A gas cooking stove comprising a support for the receptacle to be heated, a gas supply pipe, a burner having a mixing chamber, a distributing chamber to which the gas supply leads and having an admission valve, passages leading from the distributing chamber to the mixing chamber and to the pipe for a pilot flame, said admission valve opening in one position the passage to the mixing chamber and closing the passage to the pilot flame and in the other position opening the passage to the pilot flame and closing the passage to the mixing chamber, a lever having one end pivoted to the support and the other end projecting above the support so as to engage the bottom of the receptacle, another lever controlling the admission valve and having one end pivoted to the stove, a connection between the two levers and means for normally holding the levers raised and the passage to the mixing chamber closed.

2. A gas cooking stove comprising a support for the receptacle to be heated, a gas supply pipe, a burner having a mixing chamber, a distributing chamber to which the gas supply leads and having an admission valve, passages leading from the distributing chamber to the mixing chamber and to the pipe for a pilot flame, said admission valve opening in one position the passage to the mixing chamber and closing the passage to the pilot flame and in the other position opening the passage to the pilot-flame and closing the passage to the mixing chamber, a lever having one end pivoted to the support and the other end projecting above the support so as to engage the bottom of the receptacle, another lever controlling the admission valve and having one end pivoted to the stove, a connection between the two levers, a cup with stem passing the last named lever and pressed upwardly together with the said lever by a spring contained in a cover, a ball placed in the cup and closing the lower opening of a center bore in the bottom of the distributing chamber, a ball closing the upper opening of the said center bore and acting upon the admission valve and a spring connecting the two said balls.

3. A gas cooking stove comprising a support for the receptacle to be heated, a gas supply pipe, a burner having a mixing chamber, a distributing chamber to which the gas supply leads and having an admission valve, in form of a piston with an annular peripheral groove between its upper and lower ends, passages leading from the distributing chamber to the mixing chamber and to the pipe for a pilot flame, said admission valve opening in one position the passage to the mixing chamber and closing the passage to the pilot flame and in the other position opening the passage to the pilot-flame and closing the passage to the mixing chamber, a lever having one end pivoted to the support and the other end projecting above the support so as to engage the bottom of the receptacle, another lever controlling the admission valve and having one end pivoted to the stove, a connection between the two levers and means for normally holding the levers raised and the passage to the mixing chamber closed.

4. A gas cooking stove comprising a support for the receptacle to be heated, a gas supply pipe, a burner having a mixing chamber with radial air passages, a sliding ring surrounding the mixing chamber and having corresponding passages to fully or partially close the air openings of the mixing chamber, a distributing chamber to which the gas supply leads and having an admission valve, passages leading from the distributing chamber to the mixing chamber and to the pipe for a pilot flame, said admission valve opening in one position the passage to the mixing chamber and closing the passage to the pilot flame and in the other position opening the passage to the pilot-flame and closing the passage to the mixing chamber, a lever having one end pivoted to the support and the other end projecting above the support so as to engage the bottom of the receptacle, another lever controlling the admission valve and having one end pivoted to the stove, a connection between the two levers and means for normally holding the levers raised and the passage to the mixing chamber closed.

5. A gas cooking stove comprising a support for the receptacle to be heated, a gas supply pipe, a burner having a mixing chamber of a comparatively large capacity, an escaping gap formed between the casing of the burner and the cover of the same, a distributing chamber to which the gas supply leads and having an admission valve, passages leading from the distributing chamber to the mixing chamber and to the pipe for a pilot flame, said admission valve opening in one position the passage to the mixing chamber and closing the passage to the pilot flame and in the other position opening the passage to the pilot-flame and closing the passage to the mixing chamber, a lever having one end pivoted to the support and the other end projecting above the support so as to engage the bottom of the receptacle, another lever controlling the admission valve and having one end pivoted to the stove, a connection between the two levers and means for normally holding the levers raised and the passage to the mixing chamber closed.

In testimony whereof, I have signed my name to this specification in the presence of two subscribing witnesses.

JOHANN FRITSCHI.

Witnesses:
HERMANN HUBER,
ARLON T. ADAMS.

Copies of this patent may be obtained for five cents each, by addressing the "Commissioner of Patents, Washington, D. C."